United States Patent [19]
Schrock et al.

[11] Patent Number: 5,708,874
[45] Date of Patent: Jan. 13, 1998

[54] MAGNETICALLY ATTACHING FLASH UNITS TO CAMERAS

[75] Inventors: Anthony W. Schrock, Rochester; Harold J. Barrett, Brockport; Edward P. Furlani, Lancaster, all of N.Y.

[73] Assignee: Eastman Kodak Company, Rochester, N.Y.

[21] Appl. No.: 767,614

[22] Filed: Dec. 17, 1996

[51] Int. Cl.⁶ .................................................. G03B 15/03
[52] U.S. Cl. .................. 396/174; 396/155; 396/180; 362/8; 362/398; 248/309.4
[58] Field of Search ............................ 396/155, 174, 396/428, 439, 544, 180, 189; 362/3, 8, 10, 398; 248/537, 309.4

[56] References Cited

U.S. PATENT DOCUMENTS

| | | | |
|---|---|---|---|
| 2,898,447 | 8/1959 | Hanlon | 396/174 |
| 3,136,207 | 6/1964 | Flad et al. | 248/309.4 |
| 3,286,212 | 11/1966 | Thompson et al. | 248/309.4 |
| 3,545,904 | 12/1970 | Brandt | 396/192 |
| 3,641,337 | 2/1972 | Bahnsen | 362/398 |
| 3,999,055 | 12/1976 | Wakahara et al. | 362/3 |
| 5,095,325 | 3/1992 | Carstens | 362/8 |

*Primary Examiner*—A. A. Mathews
*Attorney, Agent, or Firm*—Raymond L. Owens

[57] ABSTRACT

Apparatus for fixing a flash unit to a camera is disclosed. The apparatus includes mounting magnets and a structure for shielding the fields produced by the mounting magnets in a first undocked position and for exposing the fields produced by the mounting magnets in a second docked position. The apparatus further includes a mounting structure effective in the first undocked position for causing the flash unit to be moveably mounted to the camera and for leaving the shielding structure in the first undocked position and effective when the flash unit is moved to the second docked position for causing the shielding structure to be in the second docked position whereby the exposed fields produced by the mounting magnets cause the flash unit to be fixed to the camera.

11 Claims, 6 Drawing Sheets

MAGNETICALLY ATTACHING FLASH UNITS TO CAMERAS

FIELD OF THE INVENTION

This invention relates generally to the field of photography, and in particular, to camera flash attachment.

BACKGROUND OF THE INVENTION

It is well known in the field of photography that a flash unit can be attached directly to a camera to provide an artificial light source to properly illuminate a photographic subject. In addition, flash units have been designed to be moveable in various positions relative to the camera to provide for "bounce flash." Bounce flash, which is well known in the art, enables light emitted from the flash unit to be projected onto a surface other than the photographic subject. The light is then reflected off the surface and directed to the photographic subject at an angle relative to the axis of the camera lens in order to prevent red eye.

Conventional camera flash attachment apparatus include a screw and thread mechanism for mechanical attachment with spring loaded contacts for electrical connection between the flash unit and the camera. One drawback to the mechanical attachment of a flash unit to a camera is that the screw type mechanism requires a great deal of manual dexterity, making it is easy to cross thread the screw when attaching or detaching the flash unit to the camera. Other apparatus typically used for camera flash attachment include sliding latch or "bayonet" style mounts that use mechanical friction or spring action to maintain the attachment of the flash unit to the camera. This technique is also susceptible to a number of problems, including loss of contact between the flash unit and the camera as the spring action weakens, and susceptibility of the sliding interface to corrosion, which increases the difficulty of attaching and detaching the flash unit to the camera. Additionally, a separate mechanism on the flash unit is required for bounce flash, which increases the cost and design complexity of the flash unit. Finally, none of the interfaces in the above-described apparatus are sealed, so water, sand and dirt can degrade the mechanical connection, as well as any electrical contacts required in the flash attachment apparatus.

Magnetic flash attachments have been developed to overcome the above-noted problems inherent in mechanical camera flash attachment apparatus. U.S. Pat. No. 3,641,337 entitled "Magnetic Flashgun Mount" discloses the use of a magnet to attach a photographic flashgun to a magnetically permeable surface on a camera. The flash unit is removed by manually overcoming the attractive force of the magnets. U.S. Pat. No. 5,095,325 entitled "Flash Adaptor for Adjusting the Position of a Flash Relative to a Camera While Maintaining the Flash in a Constant Angular Orientation" discloses a mechanism for locking a flash support to a camera support. One embodiment of the locking mechanism utilizes a pair of magnets positioned such that their opposite poles meet with an attractive force. The flash can be moved to a second position or removed from the camera by manually breaking the magnetic bond using a two-handed effort. U.S. Pat. No. 3,545,904 entitled "Apparatus for Sequentially Selecting Photoflash Lamps for Ignition" discloses a photoflash assembly to be used with a camera. The flash assembly is secured to a housing by the use of an electrically nonconductive magnet placed between two electrically conductive materials having high magnetic permeability. Exposed magnetized contacts in the flash assembly are attracted to corresponding contacts in the flash housing to provide the attachment force. The attachment force must be manually overcome to detach the flash assembly from the housing. In all of these patents, detachment of the flash unit from the camera occurs by manually overcoming the attractive force of the magnets or of the magnet to the magnetically permeable material, which requires a great deal of manual effort by the user. In addition, it is difficult to obtain proper alignment of the flash unit to the camera.

SUMMARY OF THE INVENTION

Accordingly, it is an object of the present invention to provide apparatus for docking and undocking a flash unit to a camera with ease.

This object is achieved by apparatus for fixing a flash unit to a camera, comprising:

(a) a mounting magnet for producing a field;

(b) shielding means for shielding the field produced by the mounting magnet in a first undocked position and for exposing the field produced by the mounting magnet in a second docked position; and (c) means effective in the first undocked position for causing the flash unit to be moveably mounted to the camera and for positioning the shielding means in the first undocked position and effective when the flash unit is moved to the second docked position for causing the shielding means to be in the second docked position so that the field produced by the mounting magnet causes the flash unit to be attracted to and fixed to the camera.

ADVANTAGES

An advantage of the present invention is to provide apparatus for docking and undocking a flash unit to a camera with ease.

Another advantage of the present invention is to provide apparatus for fixing a flash unit to a camera having rotational positioning for bounce flash.

Another advantage of the present invention is to provide apparatus for fixing a flash unit to a camera in which there is an infrared link for activating the flash unit which is particularly adaptable to provide a plurality of bounce flash positions.

Yet another advantage of the present invention is to provide apparatus for fixing a flash unit to a camera by using mounting magnets which facilitates use of an infrared link to activate the flash unit, thereby eliminating the need to use mechanical interconnects to electronically control the flash unit.

A further advantage of the present invention is to provide apparatus for fixing a flash unit to a camera that is adaptable to a sealed system for underwater and weatherproof applications.

DETAILED DESCRIPTION OF THE PREFERRED EMBODIMENT

Figure 1:
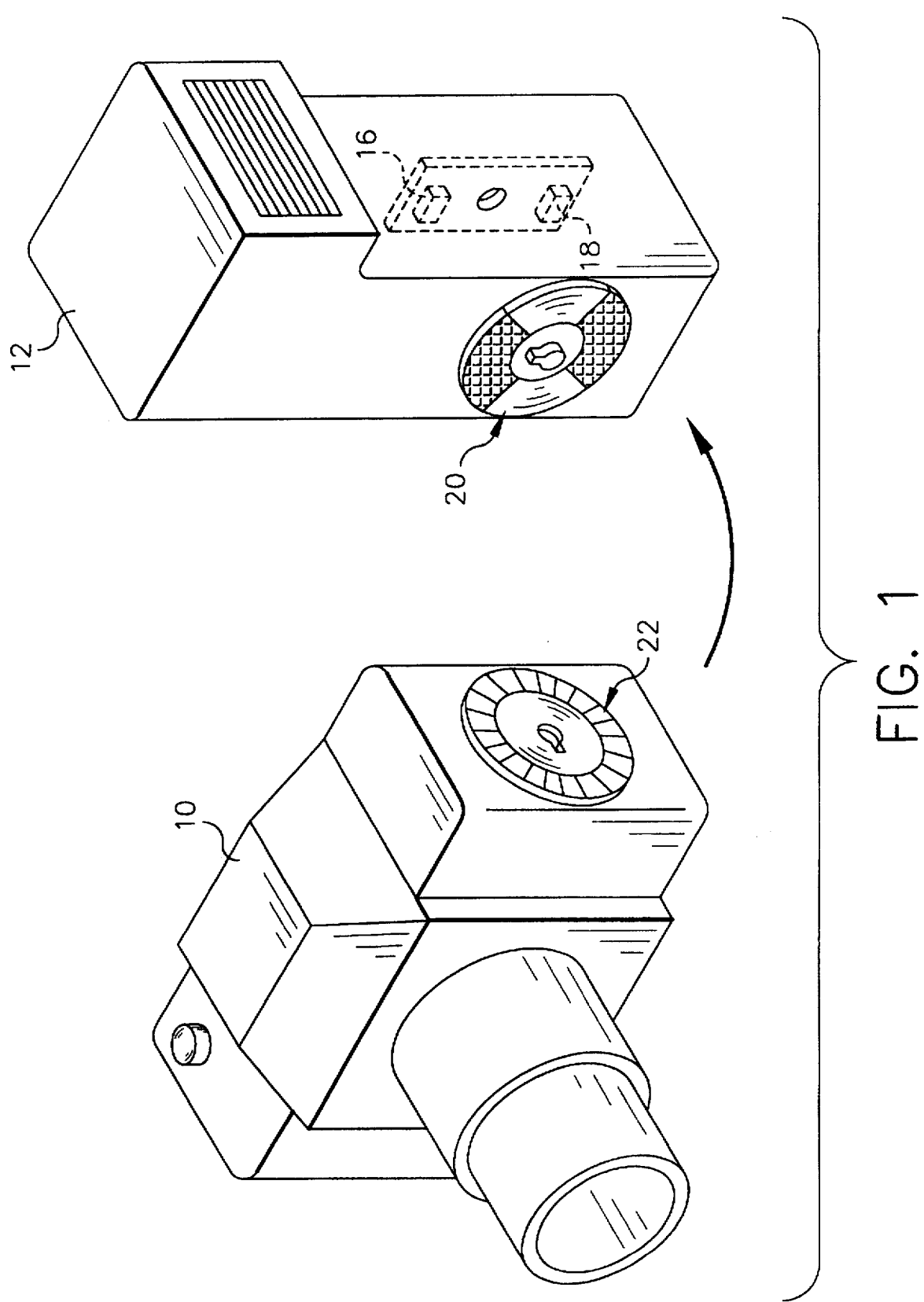
FIG. 1 is a schematic of a camera and an unattached flash unit which illustrates the attachment apparatus in accordance with the present invention.

Referring to FIG. 1, a first embodiment of the present invention is shown including a camera 10 and an unattached flash unit 12 having an apparatus for fixing the flash unit 12 to the camera 10. The attachment apparatus includes mounting magnets 16 and 18 and a shielding member 20 mounted for rotation on the flash unit 12. The attachment apparatus further includes a flash unit receiving member 22 mounted on the camera 10.

Figure 2:
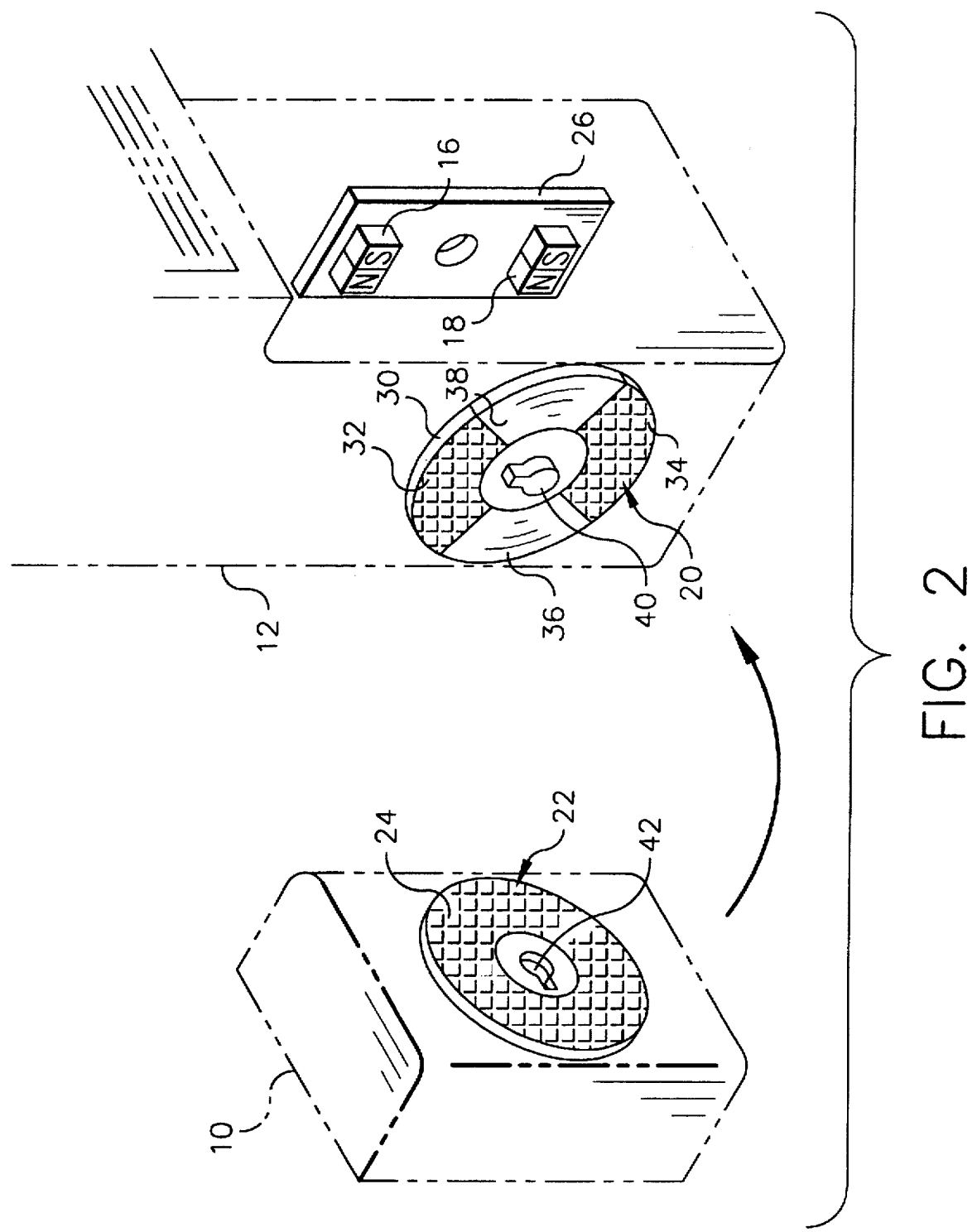
FIG. 2 is a schematic which illustrates the attachment apparatus of FIG. 1 in more detail.

Referring to FIG. 2, a schematic diagram shows the attachment apparatus in greater detail. The mounting magnets 16 and 18 are spaced-apart and fixed to the flash unit 12. The mounting magnets 16 and 18 each have a north and a south pole, and each produce a magnetic field. A ferromagnetic flux plate 26 is attached to the mounting magnets 16 and 18 to confine the mounting magnets' fields in an undocked position and direct them for mounting in a docked position. Preferably, the mounting magnets 16 and 18 are made from a high strength rare earth material such as neodynium-iron-boron [NdFeB]. The shielding member 20 includes a plate 30 that is mounted to the flash unit 12 for rotation about a common axis relative to the flash unit 12. The plate 30 can be mounted, for example, by being secured to a mounting arrangement such as ball bearings (not shown). The plate 30 includes shielding portions 32 and 34 and open (nonshielding) portions 36 and 38 positioned alternately between the shielding portions 32 and 34. The shielding portions 32 and 34 shield the mounting magnets' fields in a first docked position. Preferably, the shielding portions 32 and 34 are sector-shaped ferromagnetic flux plates that are fabricated from material with a high magnetic permeability, such as steel. The open portions 36 and 38 expose the mounting magnets' fields in a second docked position. The shielding member 20 further includes a key 40 fixed to the shielding portions 32 and 34.

As shown in FIG. 2, the flash unit receiving member 22 mounted on the camera 10 includes a fixed ferromagnetic flux plate 24 which creates an attraction to the mounting magnets 16 and 18 in the docked position. The ferromagnetic flux plate 24 can be, for example, one monolithic piece of ferromagnetic material, as shown in FIG. 2, or a plurality of independent pieces of ferromagnetic material. The flash unit receiving member 22 further includes a key receiving hole 42 formed in the ferromagnetic flux plate 24 to receive the key 40 for mounting the flash unit 12 to the camera 10. The key 40 further provides for rotation of the flash unit 12 from the undocked position to the docked position.

Alternatively, it would be understood by those skilled in the art that the mounting magnets 16 and 18, the ferromagnetic flux plate 26, and the shielding member 20 could be fixed to the camera 10, and the flash unit receiving member 22 could be mounted to the flash unit 12. In addition, it would be understood by those skilled in the art that the magnetic polarization of the mounting magnets 16 and 18 could have different orientations.

Figure 3A:
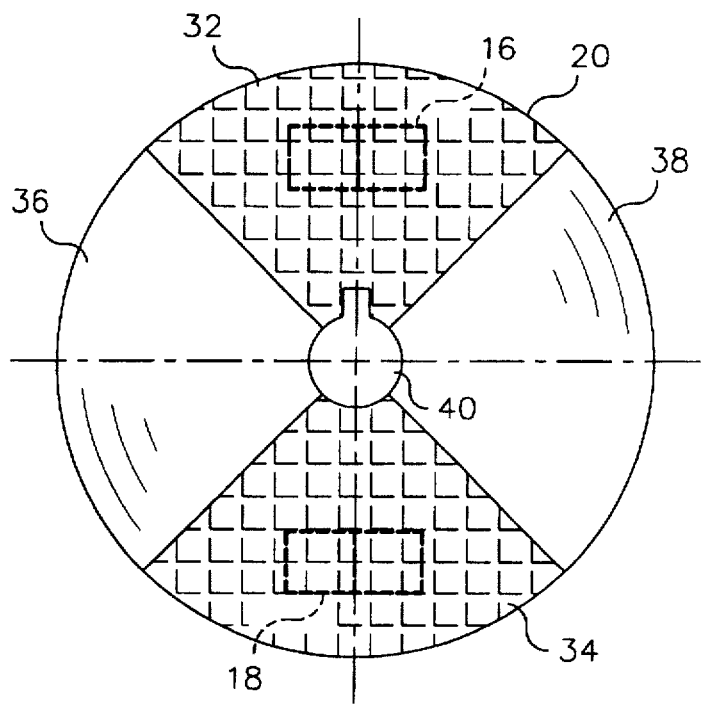
FIGS. 3A and 3B are front views of a shielding member of an attachment apparatus in the undocked and docked positions, respectively.
Figure 3B:
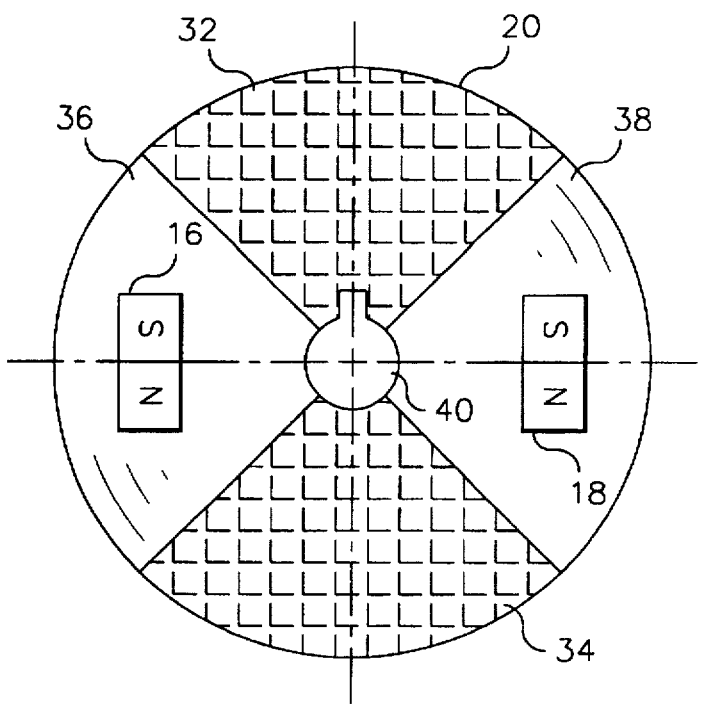

Referring to FIG. 3, a front view of the shielding member 20 and the mounting magnets 16 and 18 is shown. FIG. 3A shows the shielding member 20 in the undocked position. In the undocked position, the shielding portions 32 and 34 cover the mounting magnets 16 and 18 so as to shield their magnetic fields and prevent attraction to the ferromagnetic flux plate 24. In the docked position, as shown in FIG. 3B, the mounting magnets 16 and 18 are rotated away from the shielding portions 32 and 34 so that the mounting magnets' fields are exposed through the open portions 36 and 38. When the mounting magnets' fields are exposed, an attractive force is created between the mounting magnets 16 and 18 and the ferromagnetic flux plate 24 to fix the flash unit 12 to the camera 10.

Referring again to FIG. 2, attachment of the flash unit 12 to the camera 10 will be described. To attach the flash unit 12 to the camera 10, the flash unit 12 is brought into contact with the camera 10 so that the key 40 engages the key receiving hole 42 in the undocked position. In the undocked position, the shielding portions 32 and 34 cover the mounting magnets 16 and 18 and shield the mounting magnets' fields from the ferromagnetic flux plate 24 in the camera 10.

Once the key 40 engages the key receiving hole 42, the flash unit 12 can be rotated to the docked position. Since the key 40 is fixed to the shielding portions 32 and 34 and the mounting magnets 16 and 18 are fixed to the flash unit 12, rotation of the flash unit 12 to the docked position causes the mounting magnets 16 and 18 to rotate away from the shielding portions 32 and 34. In the docked position, the mounting magnets 16 and 18 are positioned so that the mounting magnets' fields are exposed through the open portions 36 and 38. Exposure of the mounting magnets' fields creates an attractive force between the mounting magnets' fields and the ferromagnetic flux plate 24 to fix the flash unit 12 to the camera 10. Once the flash unit 12 is fixed to the camera 10, the camera 10 can then communicate with the flash unit 12 to activate the flash unit 12 using a technique which will be described in more detail in conjunction with FIG. 4 below. To detach the flash unit 12 from the camera 10, the flash unit 12 is rotated to the undocked position. Rotation of the flash unit 12 causes the mounting magnets 16 and 18 to rotate so that the shielding portions 32 and 34 shield the mounting magnets' fields from the ferromagnetic flux plate 24. In the undocked position, the key 40 can be disengaged from the key receiving hole 42 so that the flash unit 12 can be easily removed from the camera 10. It is to be appreciated that the attachment apparatus creams a sealed interface between the camera 10 and the flash unit 12, which prevents water, sand and dirt from degrading the connection.

Figure 4:
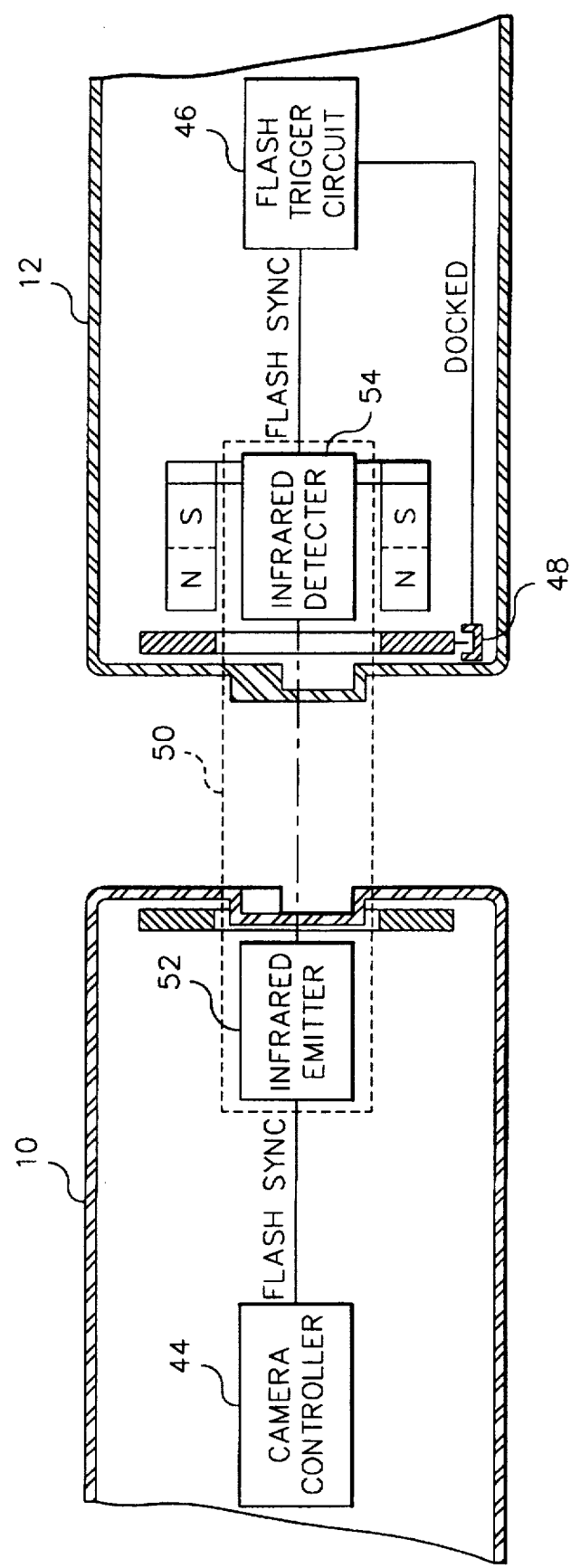
FIG. 4 is a cross-sectional schematic of an attachment apparatus including an infrared link between the camera and flash unit in accordance with the present invention.

Referring to FIG. 4, a communication technique to activate the flash unit 12 in accordance with the present invention is shown. A position sensor 48 is fixed to the flash unit 12 and detects the presence or absence of the shielding portions 32 and 34 and thus, senses whether the flash unit 12 is in the docked or undocked position. A flash trigger circuit 46 is positioned in the flash unit 12 and is effective in a disabled condition and a ready condition for activation of the flash unit 12. When the flash unit 12 is in the undocked position, the flash trigger circuit 46 is in the disabled condition. When the flash unit 12 is in the docked position, the position sensor 48 places the flash trigger circuit 46 in the ready condition.

A camera controller 44 mounted in the camera 10 communicates with the flash trigger circuit 46 using an infrared communication link 50. The infrared link 50 includes an infrared emitter 52 and an infrared detector 54. When image capture is initiated, the transmitter 52 simultaneously produces an infrared signal which is transmitted to the receiver 54. When the flash trigger circuit 46 is in the ready condition, the flash trigger circuit 46 activates the flash unit 12 in response to the infrared signal. It will be understood by one skilled in the art that mechanical interconnects needed to electronically control the flash unit 12 are eliminated by using the infrared link 50. The elimination of the mechanical interconnects makes the attachment apparatus of the present invention especially suitable for underwater and weather-proof applications.

Figure 5:
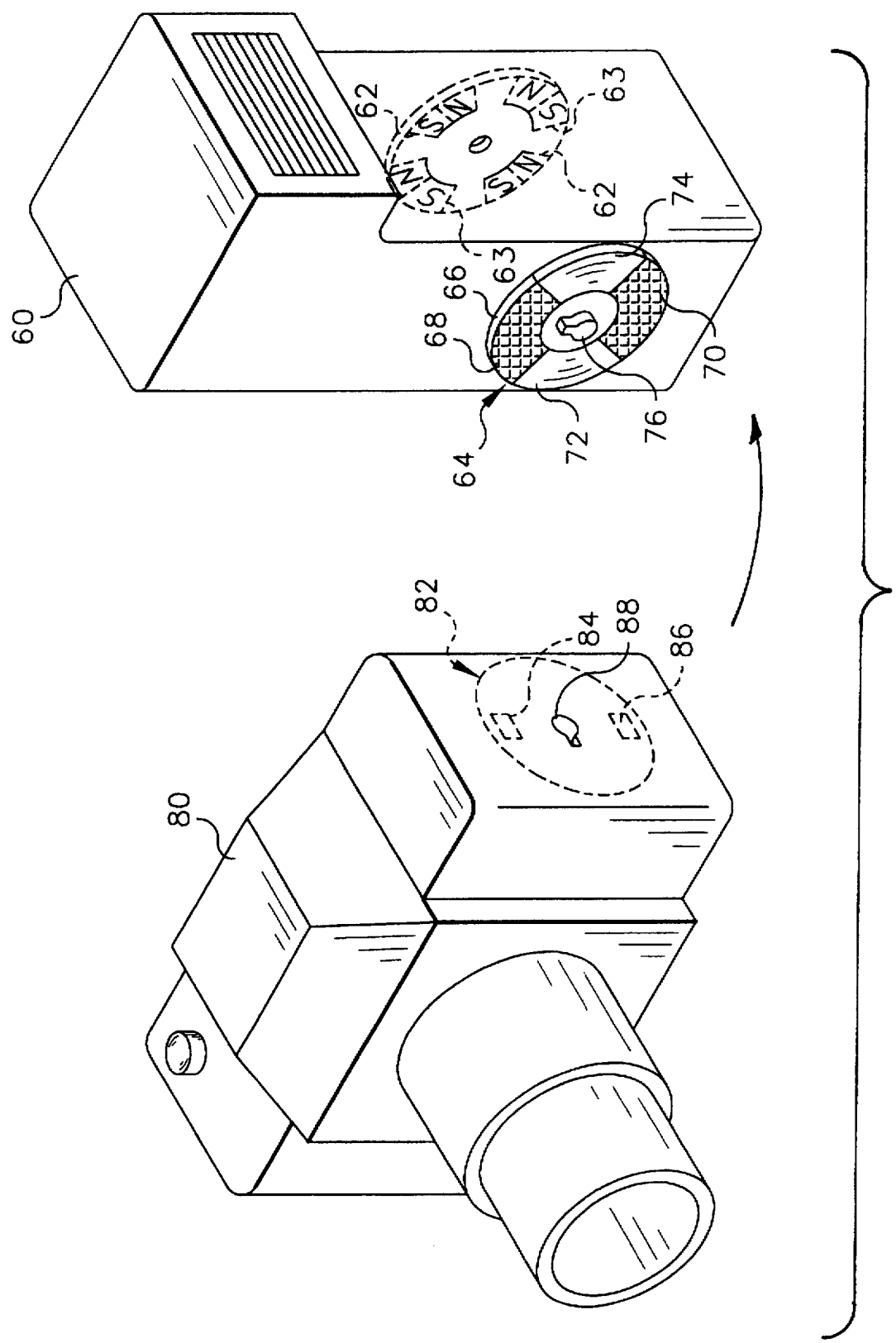
FIG. 5 is a schematic of a camera and a flash unit having an attachment apparatus with a plurality of mounting magnets in accordance with the present invention.

Referring to FIG. 5, a second embodiment of the present invention is shown in which the attachment apparatus permits the flash unit to be moved to a plurality of docked positions, and thus provides for a plurality of bounce flash positions. In this embodiment, the attachment apparatus includes first and second sets of mounting magnets 62 and 63 fixed to the flash unit 60. Each magnet has a north and a south pole, and each magnet produces a magnetic field. A shielding member 64 mounted to the flash unit 60 includes a plate 66 which rotates about a common axis relative to the flash unit 60. The plate 66 includes shielding portions 68 and 70 and open (nonshielding) portions 72 and 74 positioned alternately between the shielding portions 68 and 70. The shielding portions 68 and 70 shield the mounting magnets' fields, while the open portions 72 and 74 expose the mounting magnets' fields. Preferably, the shielding portions 68 and 70 are sector-shaped ferromagnetic flux plates that are fabricated from material with a high magnetic permeability, such as steel. The shielding member 64 also includes a key 76 to mount the flash unit 60 to a camera 80 in the same manner as that described in conjunction with the first embodiment of the present invention.

As shown in FIG. 5, the attachment apparatus further includes a flash unit receiving member 82 having spaced-apart soft ferromagnetic plates, or members, 84 and 86 mounted to the camera 80. A key receiving hole 88 is formed in the flash unit receiving member 82 to engage the key 76 for mounting the flash unit 60 to the camera 80. In the undocked position, the shielding portions 68 and 70 cover the first and second sets of mounting magnets 62 and 63 and shield the fields produced by the first and second sets of mounting magnets 62 and 63 from the soft ferromagnetic plates 84 and 86. This prevents attachment of the camera 80 to the flash unit 60. In a first docked position, the flash unit 60 is rotated so that the first set of mounting magnets 62 is exposed through the open portions 72 and 74 and aligned with the soft ferromagnetic plates 84 and 86. This creates an attractive force between the first set of mounting magnets 62 and the soft ferromagnetic plates 84 and 86 which fixes the flash unit 60 to the camera 80. The flash unit 60 can be rotated to a second docked position so that the second set of mounting magnets 63 is exposed through the open portions 72 and 74 and aligned with the soft ferromagnetic plates 84 and 86. The flash unit 60 positioned in the second docked position operates to provide bounce flash. It would be understood by those skilled in the art that the flash unit 60 could include a plurality of sets of mounting magnets so that the flash unit 60 could be rotated to a plurality of docked positions to provide a plurality of bounce flash positions.

To detach the flash unit 60 from the camera 80, the flash unit 60 is rotated to the undocked position so that the fields produced by the first and second sets of mounting magnets 62 and 63 are shielded from the soft ferromagnetic plates 84 and 86. In this position, the key 76 can be disengaged from the key receiving hole 88 and the flash unit 60 can be easily removed from the camera 80.

Alternatively, it would be understood by those skilled in the art that there could be different configurations of the mounting magnets 62 and the ferromagnetic plates 84 and 86 to provide for bounce flash.

Figure 6:
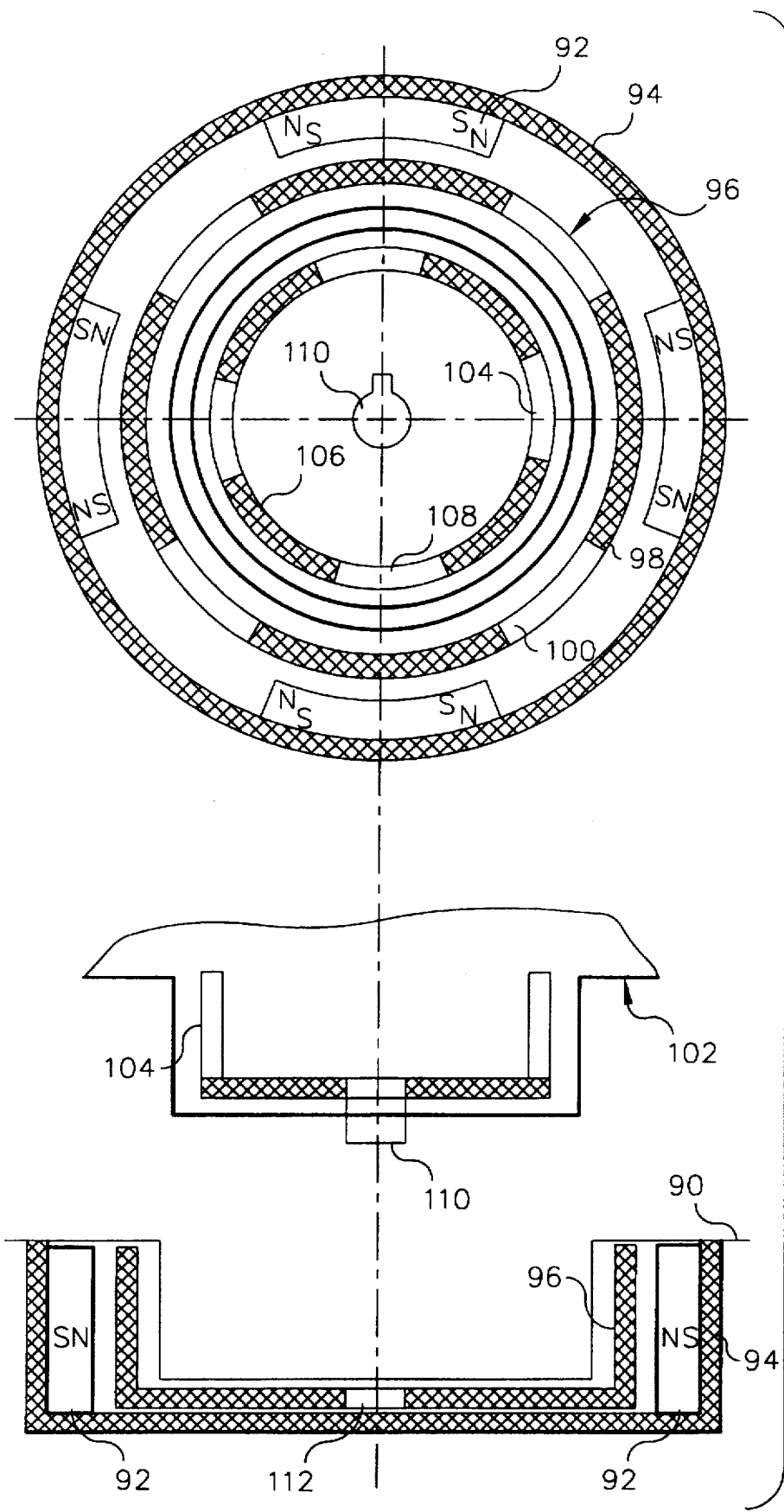
FIG. 6 is a schematic of an attachment apparatus in accordance with the present invention which provides for a plurality of docked positions.

Referring to FIG. 6, a third embodiment of the present invention is shown which also provides for a plurality of docked positions. In this embodiment, a flux plate 94 having a plurality of magnets 92 is fixed to a camera 90. Preferably, the magnets 92 are radially polarized. A shielding member 96 is mounted for rotation within the camera 90 by, for example, being secured to a mounting arrangement such as ball bearings (not shown). The shielding member 96 includes a plurality of shielding portions 98 and a plurality of open portions 100 alternately positioned between the shielding portions 98. Preferably, the shielding portions 98 are ferromagnetic flux plates that are fabricated from material with a high magnetic permeability, such as steel. A key receiving hole 112 is formed in the shielding member 96. The shielding member 96 is rotatable relative to the flux plate 94 and the magnets 92 so that the shielding portions 98 shield the magnetic fields and the open portions 100 expose the magnetic fields.

A flash unit 102 includes a plate 104 having a plurality of ferromagnetic flux portions 106 and a plurality of open portions 108 alternately positioned between the ferromagnetic flux portions 106. The flash unit 102 further includes a key 110 fixed to the flash unit 102 to mount the flash unit 102 to the camera 90 and to permit rotation of the shielding member 96.

In an undocked position, the flash unit 102 is mounted to the camera 90 by engaging the key 110 with the key receiving hole 112. In the undocked position, the shielding portions 98 of the shielding member 96 are positioned to shield the magnetic fields produced by the magnets 92. The open portions 108 in the flash unit 102 are aligned with the shielding portions 98 in the camera 90. Likewise, the ferromagnetic flux portions 106 in the flash unit 102 are aligned with the open portions 100 in the camera 90.

When the flash unit 102 is rotated to a first docked position, the plate 104 rotates with the flash unit 102. Since the key 110 is fixed to the flash unit 102, the key 110 rotates with the flash unit 102. Since the key receiving hole 112 is attached to the shielding member 96, the rotation of the key 110 causes the key receiving hole 112, and thus the shielding member 96, to rotate in unison with the plate 102. The shielding member 96 is rotated to a position so that the open portions 102 expose the magnetic fields produced by the magnets 92. The plate 102 is rotated to a position so that an attractive force is created between the magnetic fields produced by the magnets 92 and the ferromagnetic flux portions 106 to fix the flash unit 102 to the camera 90. In a similar manner, the flash unit 102 can be rotated to a plurality of docked positions to provide a plurality of bounce flash positions. To detach the flash unit 102 from the camera 90, the flash unit 102 is rotated to the undocked position so that the key 110 can be disengaged from the key receiving hole 112 and the flash unit 102 can be easily removed from the camera 90.

Alternatively, it would be understood by those skilled in the art that the magnets 92 in the camera 90 could be replaced by radially polarized magnets and the plate 104 in the flash unit 102 could be replaced with magnets having the same pole configuration as the magnets 92.

The invention has been described in detail with particular reference to certain preferred embodiments thereof. However, it will be appreciated that variations and modifications can be effected by a person of ordinary skill in the art without departing from the spirit and scope of the invention.

PARTS LIST 10 camera
12 flash unit 16, 18 mounting magnets
20 shielding member
22 flash unit receiving member
24 ferromagnetic flux plate
26 ferromagnetic flux plate
30 rotatable plate
32, 34 shielding portions
36, 38 open (nonshielding) portions
40 key
42 key receiving hole
44 camera controller
46 flash trigger circuit
48 position sensor
50 infrared communication link
52 infrared emitter
54 infrared detector
60 flash unit
62, 63 set of mounting magnets
64 shielding member
66 plate
68, 70 shielding portions
72, 74 open (nonshielding) portions
76 key
80 camera
82 flash unit receiving member
84, 86 camera magnets
88 key receiving hole
90 camera
92 magnets
94 flux plate
96 shielding member
98 shielding portions
100 open (nonshielding) portions
102 flash unit
104 plate
106 ferromagnetic flux portions
108 open portions
110 key
112 key receiving hole

What is claimed is:

1. Apparatus for fixing a flash unit to a camera, comprising:

(a) a mounting magnet for producing a field;

(b) shielding means for shielding the field produced by the mounting magnet in a first undocked position and for exposing the field produced by the mounting magnet in a second docked position; and (c) means effective in the first undocked position for causing the flash unit to be moveably mounted to the camera and for positioning the shielding means in the first undocked position and effective when the flash unit is moved to the second docked position for causing the shielding means to be in the second docked position so that the field produced by the mounting magnet causes the flash unit to be attracted to and fixed to the camera.

2. The apparatus of claim 1 wherein there are a plurality of mounting magnets, each producing its individual field.

3. Apparatus for fixing a flash unit to a camera, comprising:

(a) the flash unit including mounting magnets for producing fields and means for shielding the fields produced by the mounting magnets in a first undocked position and for exposing the fields produced by the mounting magnets in a second docked position; and (b) the camera having flash unit receiving means effective in the first undocked position for moveably mounting the flash unit and for positioning the shielding means in the first undocked position and effective when the flash unit is moved to the second docked position for causing the shielding means to be in the second docked position so that the fields produced by the mounting magnets cause the flash unit to be attracted to and fixed to the camera.

4. The apparatus of claim 3 wherein the flash unit receiving means includes a ferromagnetic member mounted in the camera and the mounting magnets being fixably mounted in the flash unit and the shielding means includes a rotatable plate which includes field shielding portions which shield the fields produced by the mounting magnets from the ferromagnetic member and including nonshielding portions which expose the fields produced by the mounting magnets to the ferromagnetic member to fix the flash unit to the camera.

5. The apparatus of claim 3 wherein the flash unit receiving means defines a key receiving hole and the shielding means includes a key which engages the hole in the first undocked position and permits rotation of the flash unit to the second docked position.

6. The apparatus of claim 5 wherein the key receiving hole and the key are configured so that there can be a plurality of docked positions which permit adjustment of the flash unit to provide for bounce flash.

7. Apparatus for fixing a flash unit to a camera and providing bounce flash, comprising:

(a) spaced apart ferromagnetic members fixed to the camera;

(b) first and second sets of mounting magnets fixed to the flash unit, each mounting magnet having respective north and south poles and each mounting magnet producing a field, the mounting magnets being arranged so as to permit the flash unit to be moved to a plurality of docked positions which permit adjustment of the flash unit to provide for bounce flash;

(c) shielding means for shielding the fields produced by the first and second sets of mounting magnets in an undocked position, for exposing the fields produced by the first set of mounting magnets in a first docked position so that the ferromagnetic members are aligned with the first set of mounting magnets to create an attractive force, and for exposing the fields produced by the second set of mounting magnets in a second docked position so that the ferromagnetic members are aligned with the second set of mounting magnets to create an attractive force; and (d) means effective in the undocked position for causing the flash unit to be moveably mounted to the camera and for positioning the shielding means in the undocked position and effective when the flash unit is moved to the first and second docked positions for causing the shielding means to be in the first and second docked positions, respectively, and for fixing the flash unit to the camera which permits adjustment of the flash unit to provide for bounce flash.

8. Apparatus for fixing a flash unit to a camera and providing bounce flash, comprising:

(a) spaced apart ferromagnetic members fixed to the camera;

(b) first and second sets of mounting magnets fixed to the flash unit, each set being spaced apart from the other set and each mounting magnet having respective north and south poles and each mounting magnet producing a field, the mounting magnets being arranged so as to permit the flash unit to be moved to a plurality of docked positions which permit adjustment of the flash unit to provide for bounce flash;

(c) a shielding member fixed to the flash unit having shielding portions which shield the fields produced by the first and second sets of mounting magnets in an undocked position, and nonshielding portions which expose the fields produced by the first set of mounting magnets to the ferromagnetic members in a first docked position to create an attractive force and which expose the fields produced by the second set of mounting magnets to the ferromagnetic members in a second docked position to create an attractive force; and (d) means effective in the undocked position for causing the flash unit to be moveably mounted to the camera and for positioning the shielding means in the undocked position and effective when the flash unit is moved to the first and second docked positions for causing the shielding means to be in the first and second docked positions, respectively, and for fixing the flash unit to the camera which permits adjustment of the flash unit to provide for bounce flash.

9. Apparatus for fixing a flash unit to a camera, comprising:

(a) mounting magnets having respective north and south poles and each producing a field, the mounting magnets being arranged so as to permit the flash unit to be moved to a plurality of docked positions which permit adjustment of the flash unit to provide for bounce flash;

(b) shielding means rotatably mounted in the camera for shielding the fields produced by the mounting magnets in a first undocked position and for exposing the fields produced by the mounting magnets in a second docked position and having a key receiving hole; and (c) a ferromagnetic member rotatably mounted in the flash unit having shielding portions which shield the fields produced by the mounting magnets in the undocked position and nonshielding portions which expose the fields produced by the mounting magnets to the ferromagnetic member in the docked position, and having a key which engages the key receiving hole so that when the key is rotated to the docked position, the shielding means and the ferromagnetic member are rotated so that the fields produced by the mounting magnets are attracted to the ferromagnetic member to fix the flash unit to the camera.

10. Apparatus for fixing a flash unit to a camera and activating the flash unit, comprising:

(a) a mounting magnet for producing a field;

(b) shielding means including shielding portions for shielding the field produced by the mounting magnet in a first undocked position and nonshielding portions for exposing the field produced by the mounting magnet in a second docked position;

(c) means effective in the undocked position for causing the flash unit to be moveably mounted to the camera and for positioning the shielding means in the first undocked position and effective when the flash unit is moved to the docked position for causing the shielding means to be in the second docked position so that the field produced by the mounting magnet causes the flash unit to be attracted to and fixed to the camera;

(d) activatable flash trigger means disposed in the flash unit and effective in a disabled condition and a ready condition for activating the flash unit, such flash trigger means being adapted to activate the flash unit in response to an infrared signal when in the ready condition; and (e) means in the camera for producing the infrared signal simultaneously with initiating image capture.

11. The apparatus of claim 10 wherein the flash trigger means includes a position sensor for sensing the position of the flash unit in the docked position and for placing the flash trigger means in the ready condition when the flash unit is in the docked position.

* * * * *